US009971218B2

(12) United States Patent
Zou et al.

(10) Patent No.: US 9,971,218 B2
(45) Date of Patent: May 15, 2018

(54) DISPLAY DEVICE, DISPLAY PANEL, ARRAY SUBSTRATE AND DRIVING METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Zongjun Zou, Xiamen (CN); Yanfang Tang, Xiamen (CN); Ying Sun, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 7 days.

(21) Appl. No.: 15/401,705

(22) Filed: Jan. 9, 2017

(65) Prior Publication Data
US 2017/0115543 A1 Apr. 27, 2017

(30) Foreign Application Priority Data

Sep. 29, 2016 (CN) .......................... 2016 1 0863443

(51) Int. Cl.
G02F 1/13 (2006.01)
G02F 1/1362 (2006.01)
(Continued)

(52) U.S. Cl.
CPC ...... *G02F 1/136286* (2013.01); *G02F 1/1368* (2013.01); *G02F 1/133345* (2013.01);
(Continued)

(58) Field of Classification Search
None
See application file for complete search history.

(56) References Cited

U.S. PATENT DOCUMENTS

2010/0188378 A1* 7/2010 Chiang ................ G09G 3/3648
345/206
2013/0141660 A1* 6/2013 Wang ................ G02F 1/136286
349/43
2015/0185929 A1* 7/2015 Xu ..................... G02F 1/136286
345/173

FOREIGN PATENT DOCUMENTS

CN 103578443 A 2/2014

* cited by examiner

*Primary Examiner* — Nicholas Lee
(74) *Attorney, Agent, or Firm* — Anova Law Group, PLLC

(57) ABSTRACT

A display device, a display panel, an array substrate and a driving method thereof are provided. The array substrate includes a plurality of pixel units arranged in an array, m number of gate electrode lines extending along a first direction, a plurality of data lines and m number of lead wires extending along a second direction. The plurality of pixel units are arranged in pixel columns along the second direction and m number of pixel rows along the first direction. Each pixel column is disposed between two adjacent data lines. Pixel units in an $i^{th}$ pixel row are connected to an $i^{th}$ gate electrode line, and the $i^{th}$ gate electrode line is connected to an $i^{th}$ lead wire, where i is a positive integer and $1 \leq i \leq m$. The pixel units in the $i^{th}$ pixel row are connected to different data lines far away from the $i^{th}$ lead wire, respectively.

17 Claims, 10 Drawing Sheets

(51) Int. Cl.
G02F 1/1333 (2006.01)
G02F 1/1335 (2006.01)
G02F 1/1343 (2006.01)
G02F 1/1368 (2006.01)
G09G 3/36 (2006.01)
*G02F 1/1345* (2006.01)

(52) U.S. Cl.
CPC .. G02F 1/133514 (2013.01); G02F 1/134336 (2013.01); G09G 3/3648 (2013.01); *G02F 1/13454* (2013.01); *G02F 1/134363* (2013.01); *G02F 2001/13456* (2013.01); *G02F 2001/134381* (2013.01); *G02F 2201/121* (2013.01); *G02F 2201/123* (2013.01); *G09G 2300/0426* (2013.01); *G09G 2310/0281* (2013.01)

DISPLAY DEVICE, DISPLAY PANEL, ARRAY SUBSTRATE AND DRIVING METHOD THEREOF

CROSS-REFERENCES TO RELATED APPLICATIONS

This application claims priority of Chinese Patent Application No. 201610863443.2, filed on Sep. 29, 2016, the entire contents of which are hereby incorporated by reference.

FIELD OF THE INVENTION

The present disclosure generally relates to the field of display technology and, more particularly, relates to a display device, a display panel, an array substrate and a driving method thereof.

BACKGROUND

FIG. 1 illustrates an existing array substrate. Referring to FIG. 1, the existing array substrate includes a plurality of gate electrode lines 10, a plurality of data lines 11, a plurality of pixel units 12, a gate electrode driving circuit 13, and a data driving circuit 14, etc.

In existing technologies, the gate electrode driving circuit 13 is often disposed on the left side or the right side of the array substrate, such that the gate electrode driving circuit 13 can be directly connected to the gate electrode lines 10. However, to reduce the width of left and right borders of the array substrate and realize the design of a narrow frame for the display device, as shown in FIG. 1, the gate electrode driving circuit 13 is disposed on the top side of the array substrate. Further, the gate electrode driving circuit 13 is connected to the gate electrode lines 10 via vertical lead wires 15. Each lead wire 15 and one adjacent data line 11 are disposed in the same gap between two adjacent pixel units 12, thus avoiding the influence of the lead wires 15 on the transmittance of the pixel units 12.

The pixel units 12 shown in FIG. 1 are scanned sequentially row by row. However, when scanning a specific row of the pixel units 12, the gate electrode driving circuit 13 may supply a scanning signal to the gate electrode line 10 connected to this specific row of the pixel units 12 as well as the lead wire 15 connected to the gate electrode line 10. Simultaneously, the data driving circuit 14 may supply a data driving signal to all the data lines 11. By then, the scanning signal transmitted by the lead wire 15 may have mutual interference with the data driving signal transmitted by the data line 11 disposed close to the lead wire 15. Accordingly, the pixel unit 12 in this specific row of the pixel units 12 that is connected to the corresponding data line 11 may display abnormally.

The disclosed display device, display panel, array substrate and driving method thereof are directed to solving at least partial problems set forth above and other problems.

BRIEF SUMMARY OF THE DISCLOSURE

One aspect of the present disclosure provides an array substrate. The array substrate includes a plurality of pixel units arranged in an array, and m number of gate electrode lines extending along a first direction, where m is a positive integer. The array substrate further includes a plurality of data lines extending along a second direction, and m number of lead wires extending along the second direction. The plurality of pixel units are arranged in pixel columns along the second direction and m number of pixel rows along the first direction. Each of the pixel columns is disposed between two adjacent data lines. Each of the lead wires is disposed corresponding to a nearby data line. Each of the pixel units is connected to an adjacent data line. Pixel units in an $i^{th}$ pixel row are correspondingly connected to an $i^{th}$ gate electrode line, where i is a positive integer and $1 \leq i \leq m$. The $i^{th}$ gate electrode line is correspondingly connected to an $i^{th}$ lead wire, and the pixel units in the $i^{th}$ pixel row are connected to different data lines far away from the $i^{th}$ lead wire, respectively.

Another aspect of the present disclosure provides a method for driving an array substrate. The array substrate includes a plurality of pixel units arranged in an array, and m number of gate electrode lines extending along a first direction, where m is a positive integer. The array substrate further includes a plurality of data lines extending along a second direction, and m number of lead wires extending along the second direction. The plurality of pixel units are arranged in pixel columns along the second direction and m number of pixel rows along the first direction. Each of the pixel columns is disposed between two adjacent data lines. Each of the lead wires is disposed corresponding to a nearby data line. Each of the pixel units is connected to an adjacent data line. Pixel units in an $i^{th}$ pixel row are correspondingly connected to an $i^{th}$ gate electrode line, where i is a positive integer and $1 \leq i \leq m$. The $i^{th}$ gate electrode line is correspondingly connected to an $i^{th}$ lead wire, and the pixel units in the $i^{th}$ pixel row are connected to different data lines far away from the $i^{th}$ lead wire, respectively. The method includes inputting a scanning signal to the $i^{th}$ lead wire, and inputting data driving signals to the data lines far away from the $i^{th}$ lead wire.

Other aspects of the present disclosure can be understood by those skilled in the art in light of the description, the claims, and the drawings of the present disclosure.

BRIEF DESCRIPTION OF THE DRAWINGS

To make more clearly the explanation of technical solutions in embodiments of the present disclosure or current techniques, drawings needed in the embodiments or current techniques are briefly illustrated below. Apparently, the drawings described below only correspond to some embodiments of the present disclosure, and it is possible for those ordinarily skilled in the art to derive other drawings from the accompanying drawings without creative effort.

DETAILED DESCRIPTION

The technical solutions in the embodiments of the present disclosure will be described as follows in a clear and complete manner with reference to the accompanying drawings in the embodiments of the present disclosure. Clearly, the embodiments described below are merely partial, rather than entire, embodiments of the present disclosure. On the basis of the embodiments of the present disclosure, all other embodiments obtainable by those ordinarily skilled in the art without creative effort shall all fall within the protection scope of the present disclosure.

As discussed above, an array substrate in an existing liquid crystal display panel often includes a plurality of gate electrode lines, a plurality of data lines, a plurality of pixel units, a gate electrode driving circuit, and a data driving circuit, etc. The pixel units are scanned sequentially row by row, and when scanning one row of the pixel units, the gate electrode driving circuit supplies a scanning signal to the gate electrode line connected to the one row of the pixel units as well as the lead wire connected to the same gate electrode line. Simultaneously, the data driving circuit supplies a data driving signal to all the data lines, resulting in mutual interference between the scanning signal transmitted by the lead wire and the data driving signal transmitted by the data line close to the lead wire. Accordingly, the pixel unit in the one row of the pixel units connected to the data line interfered with the lead wire may display abnormally (e.g., display an abnormal brightness).

Directed to solving at least partial problems set forth above and other problems, the present disclosure provides a display device, display panel, improved array substrate and driving method thereof. According to the present disclosure, an additional data line is disposed on the left side or the right side of the array substrate, and the additional data line extends in parallel to the original data lines. Thus, the pixel units in each pixel row may individually be connected to one data line that is far away from a corresponding lead wire. Accordingly, the mutual interference between the signals transmitted by a lead wire and the data line disposed close to the lead wire may be avoided, and the abnormal display issue of the pixel units caused by signal interference may also be avoided.

Figure 1:
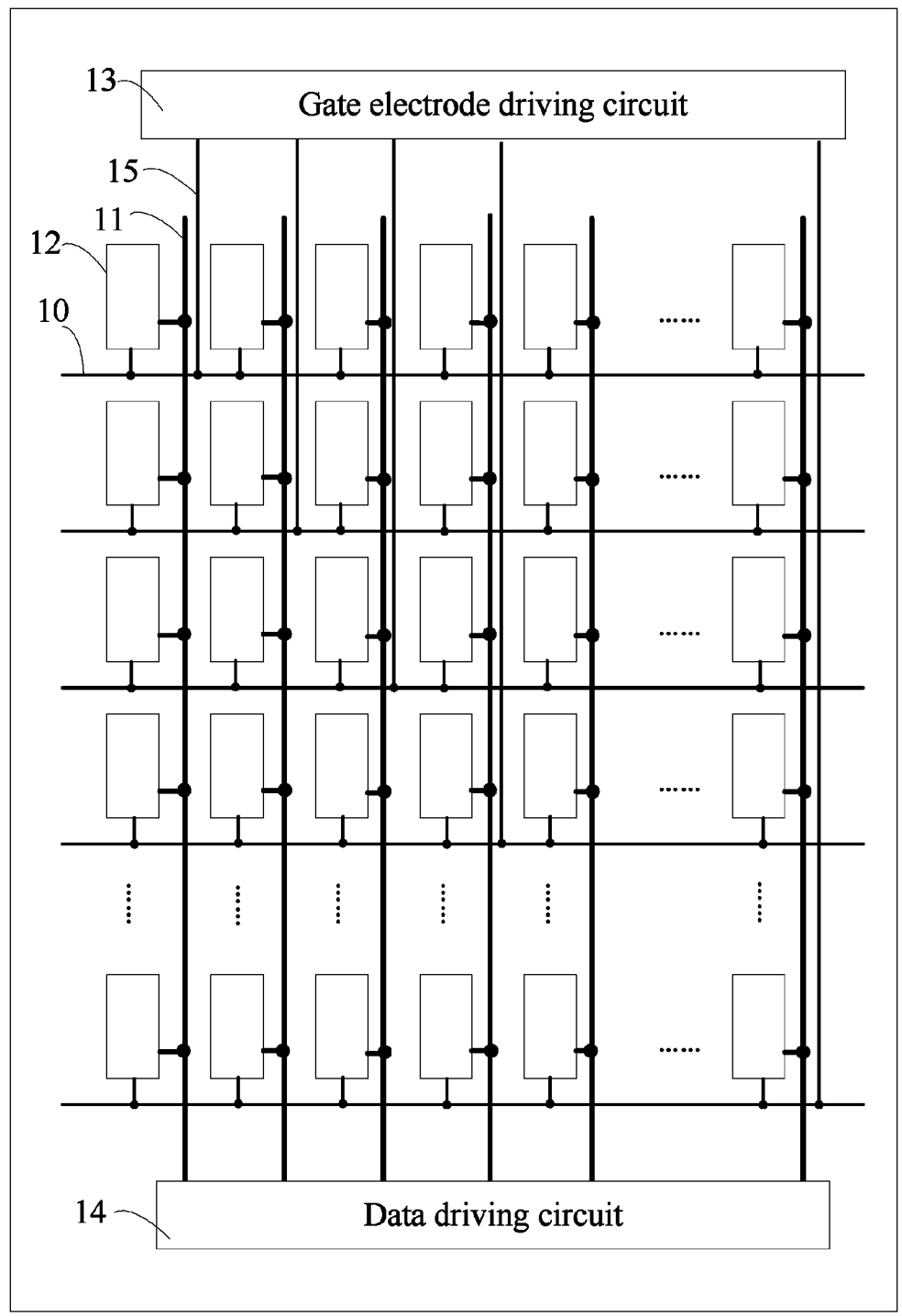
FIG. 1 illustrates an existing array substrate.
Figure 2:
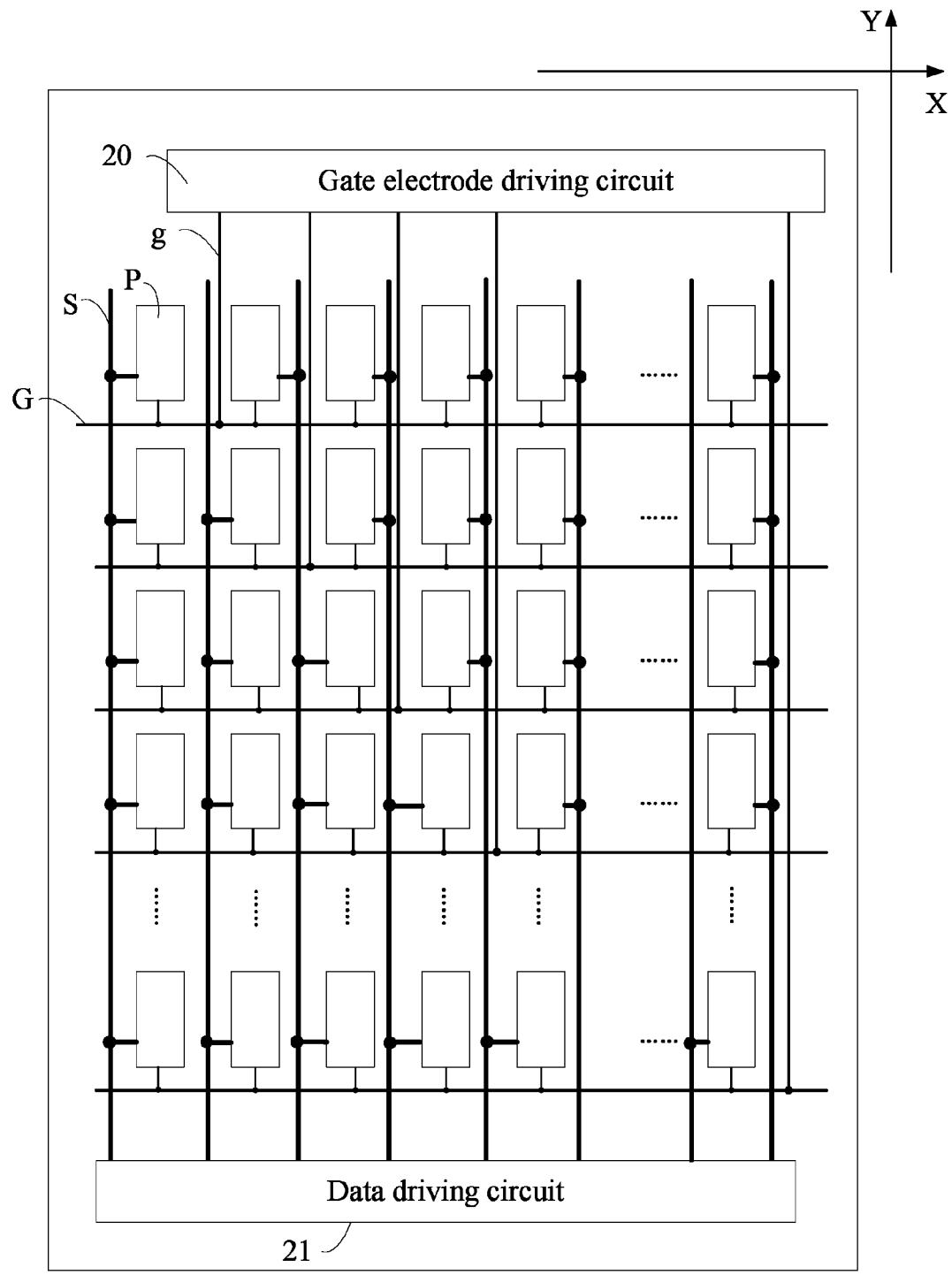
FIG. 2 illustrates an exemplary array substrate consistent with disclosed embodiments.

The present disclosure provides an array substrate. FIG. 2 illustrates an exemplary array substrate consistent with disclosed embodiments. Referring to FIG. 2, the array substrate may include a plurality of gate electrode lines G extending along a first direction X, a plurality of data lines S extending along a second direction Y, a plurality of pixel units P, and a plurality of lead wires g extending along the second direction Y. Further, the array substrate may also include a gate electrode driving circuit 20 and a data driving circuit 21.

Figure 3:
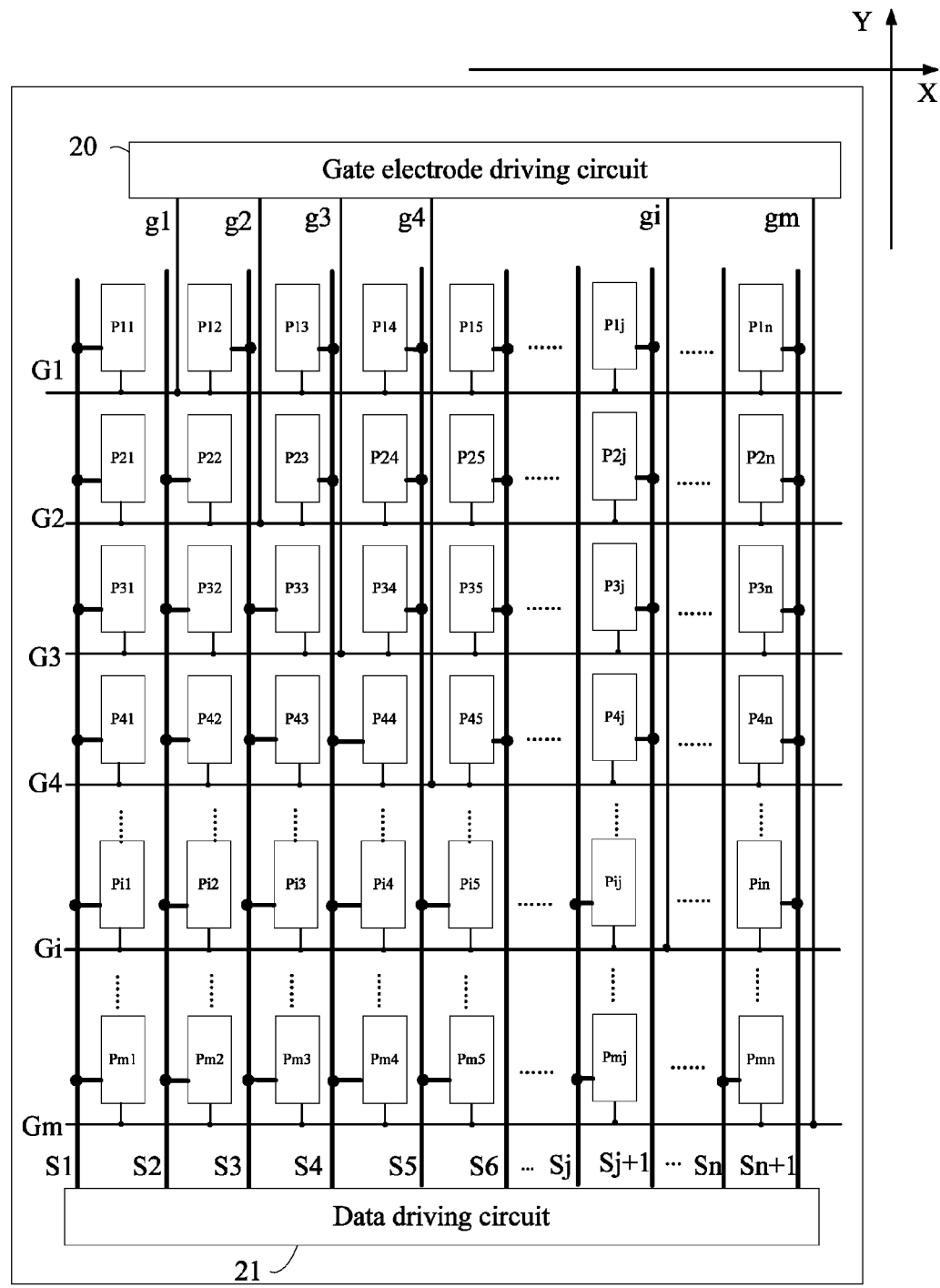
FIG. 3 illustrates a specific structure of an exemplary array substrate in FIG. 2 consistent with disclosed embodiments.

FIG. 3 illustrates a specific structure of an exemplary array substrate in FIG. 2 consistent with disclosed embodiments. In particular, referring to FIG. 3, the m number of gate electrode lines G extending along the first direction X may include gate electrode lines G1 to Gm, where m is a positive integer greater than or equal to 1. The plurality of data lines S extending along the second direction may include (n+1) data lines (i.e., data lines S1 to Sn+1), where n is a positive integer greater than or equal to 1. The plurality of pixel units may include pixel units P11 to Pmn. The m number of lead wires g extending along the second direction Y may include lead wires g1 to gm. Further, the first direction X may intersect with or be perpendicular to the second direction Y.

In one embodiment, the plurality of pixel units P may be arranged in an array. That is, the plurality of pixel units P may be arranged in a plurality of pixel columns along the second direction Y, and a plurality of pixel rows along the first direction X. Optionally, in each pixel row, red pixel units (R), green pixel units (G), and blue pixel units (B) may be arranged periodically, and in each pixel column, all pixel units may have the same color. That is, in each pixel row, every three pixel units in different colors (i.e., red, green, and blue) may form a periodic arrangement, and pixel units in the same pixel column may have the same color (i.e., red, green, or blue).

As shown in FIG. 3, the pixel units arranged in an array may include m pixel rows and n pixel columns. Further, pixel units Pi1 to Pin in an $i^{th}$ pixel row may correspondingly be connected to an $i^{th}$ gate electrode line Gi, and the $i^{th}$ gate electrode line Gi may correspondingly be connected to an $i^{th}$ lead wire gi, where 1≤i≤m, and i and m are both positive integers. That is, i may be any positive integer between 1 and m, including endpoint values (i.e., 1 and m).

Specifically, each gate electrode line G may correspondingly be connected to all pixel units P in one pixel row, and each lead wire g may be connected to a corresponding gate electrode line G. As shown in FIG. 3, the gate electrode line G1 may be connected to pixel units P11 to P1n in the first pixel row, and a gate electrode line G2 may be connected to pixel units P21 to P2n in the second pixel row. Similarly, a gate electrode line G3 may be connected to pixel units P31 to P3n in the third pixel row, a gate electrode line G4 may be connected to pixel units P41 to P4n in the fourth pixel row, . . . , and the gate electrode line Gm may be connected to pixel units Pm1 to Pmn in the mth pixel row.

Further, the lead wire g1 may correspondingly be connected to the gate electrode line G1, and a lead wire g2 may correspondingly be connected to the gate electrode line G2. Similarly, a lead wire g3 may correspondingly be connected to the gate electrode line G3, a lead wire g4 may correspondingly be connected to the gate electrode line G4, . . . , and the lead wire gm may correspondingly be connected to the gate electrode line Gm.

In one embodiment, each pixel column may be disposed between two adjacent data lines S. For example, an jth pixel column may be disposed between a data line Sj and a data line Sj+1, where j is a positive integer between 1 and n (including endpoint values 1, and n). As shown in FIG. 3, the first pixel column may be disposed between the data line S1 and a data line S2, the second pixel column may be disposed between the data line S2 and a data line S3, and the third pixel column may be disposed between the data line S3 and a data line S4. Similarly, the fourth pixel column may be disposed between the data line S4 and a data line S5, the fifth pixel column may be disposed between the data line S5 and a data line S6, . . . , and the nth pixel column may be disposed between a data line Sn and the data line Sn+1.

Further, to avoid the lead wires g affecting the transmittance of pixel units P, each lead wire g and a corresponding data line S may be disposed in the same column gap between two adjacent pixel columns in the pixel unit array. Further, each lead wire g may be disposed close to one data line S, for example, the lead wire gi may be disposed close to the data line Sj+1. Specifically, as shown in FIG. 3, the lead wire g1 may be disposed close to the data line S2, and the lead wire g2 may be disposed close to the data line S3. Similarly, the lead wire g3 may be disposed close to the data line S4, the lead wire g4 may be disposed close to the data line S5, . . . , and the lead wire gm may be disposed close to the data line Sn+1.

Further, each disclosed pixel unit P may be connected to one data line S nearby, and the pixel units P in each pixel row may be connected to different data lines S, respectively. For example, the pixel units in the $i^{th}$ pixel row may be connected to the data lines S far away from the $i^{th}$ lead wire gi, respectively. Specifically, in one embodiment, in the $i^{th}$ pixel row, the pixel unit P disposed on the left side of the $i^{th}$ lead wire gi may be connected to the data line on the left side of the pixel unit P, and the pixel unit (not shown) disposed on the right side of the $i^{th}$ lead wire gi may be connected to the data line (not shown) on the right side of the pixel unit (not shown).

Specifically, as shown in FIG. 3, given the fourth pixel row, a pixel unit P41 disposed on the left side of the fourth lead wire g4 may be connected to the data line S1 on the left side of the pixel unit P41, a pixel unit P42 disposed on the left side of the fourth lead wire g4 may be connected to the data line S2 on the left side of the pixel unit P42, and a pixel unit P43 disposed on the left side of the fourth lead wire g4 may be connected to the data line S3 on the left side of the pixel unit P43. Similarly, a pixel unit P44 disposed on the left side of the fourth lead wire g4 may be connected to the data line S4 on the left side of the pixel unit P44, a pixel unit P45 disposed on the right side of the fourth lead wire g4 may be connected to the data line S6 on the right side of the pixel unit P45, . . . , and a pixel unit P4n disposed on the right side of the fourth lead wire g4 may be connected to the data line Sn+1 on the right side of the pixel unit P4n.

In one embodiment, the number of the data lines S may equal to the number of pixel columns plus one. Thus, in addition to the original number of data lines S the same as the number of pixel units P in each pixel row, the disclosed array substrate may have an additional data line S on the left side or the right side of the array substrate. Accordingly, pixel units P in each pixel row may, respectively, be connected to one data line S that is far away from the corresponding lead wire g.

The connection method between the data lines S and the pixel units P shown in FIG. 2 and FIG. 3 may ensure that different pixel units P in the $i^{th}$ pixel row are connected to different data lines S, respectively. Thus, the interference between data driving signals caused by two or more pixel units P in the $i^{th}$ pixel row being connected to the same data line S may be avoided. Further, by connecting all the pixel units P in the $i^{th}$ pixel row, respectively, to one data line far away from the $i^{th}$ lead wire, the connection method between the data lines S and the pixel units P shown in FIG. 2 and FIG. 3 may also avoid interference between the scanning signal transmitted by the $i^{th}$ lead wire gi and the data driving signal transmitted by the data line Sj+1 disposed close to the $i^{th}$ lead wire gi.

For example, when i equals to 1, the pixel unit P11 disposed on the left side of the first lead wire g1 in the first pixel row may be connected to the data line S1 on the left side of the pixel unit P11, and a pixel unit P12 disposed on the right side of the first lead wire g1 may be connected to the data line S3 on the right side of the pixel unit P12. Similarly, a pixel unit P13 disposed on the right side of the first lead wire g1 may be connected to the data line S4 on the right side of the pixel unit P13, . . . , and a pixel unit P1n disposed on the right side of the first lead wire g1 may be connected to the data line Sn+1 on the right side of the pixel unit P1n.

When scanning the first pixel row, the pixel unit P11 in the first pixel row may transmit the data driving signal via the data line S1 far away from the first lead wire g1, and the pixel unit P12 may transmit the data driving signal via the data line S3 far away from the first lead wire g1. Similarly, the pixel unit P13 may transmit the data driving signal via the data line S4 far away from the first lead wire g1, . . . , the pixel unit P1n may transmit the data driving signal via the data line Sn+1 far away from the first lead wire g1. The data line S2 close to the first lead wire g1 may not transmit the data driving signal.

Further, the data line S2 may transmit the data driving signal only when another pixel row other than the first pixel row is scanned. That is, the first lead wire g1 and the data line S2 disposed close to the first lead wire g1 may not transmit signals simultaneously. Accordingly, the mutual interference between signals transmitted by the first lead wire g1 and the data line S2 disposed close to the first lead wire g1 may be avoided, and the abnormal display issue (e.g., abnormal brightness) of the pixel unit P11 caused by signal interference may further be avoided.

Further, the disclosed array substrate may also include a gate electrode driving circuit 20 and a data driving circuit 21. As shown in FIG. 2, the gate electrode driving circuit 20 may be disposed in an extension direction of the lead wires g. Optionally, the gate electrode driving circuit 20 and the data driving circuit 21 may be disposed on two opposite regions of the array substrate. The gate electrode driving circuit 20 may be connected to a plurality of lead wires g. Further, the gate electrode driving circuit 20 may be configured to input scanning signals to the plurality of lead wires g sequentially.

In particular, as shown in FIG. 3, the gate electrode driving circuit 20 may sequentially input the scanning signals to the lead wire g1 till the lead wire gm. Or, the gate electrode driving circuit 20 may sequentially input the scanning signals to the lead wire gm till the lead wire g1. However, the present disclosure is not limited thereto. Further, the data driving circuit 21 may be connected to a plurality of data lines S. When the gate electrode driving circuit 20 inputs the scanning signal to the $i^{th}$ lead wire gi, the data driving circuit 21 may be configured to simultaneously input the data driving signals to the data lines S far away from the $i^{th}$ lead wire gi. That is, the data driving circuit 21 may input the data driving signals to all the data lines S excluding the data line Sj+1.

In one embodiment, the plurality of lead wires g may be sequentially disposed in the column gaps of the pixel unit array along the first direction X. That is, two adjacent lead wires g may be spaced apart by one pixel column. For example, the first lead wire g1 may be disposed in the column gap between the first pixel column and the second pixel column, the second lead wire g2 may be disposed in the column gap between the second pixel column and the third pixel column, and so forth.

Figure 4:
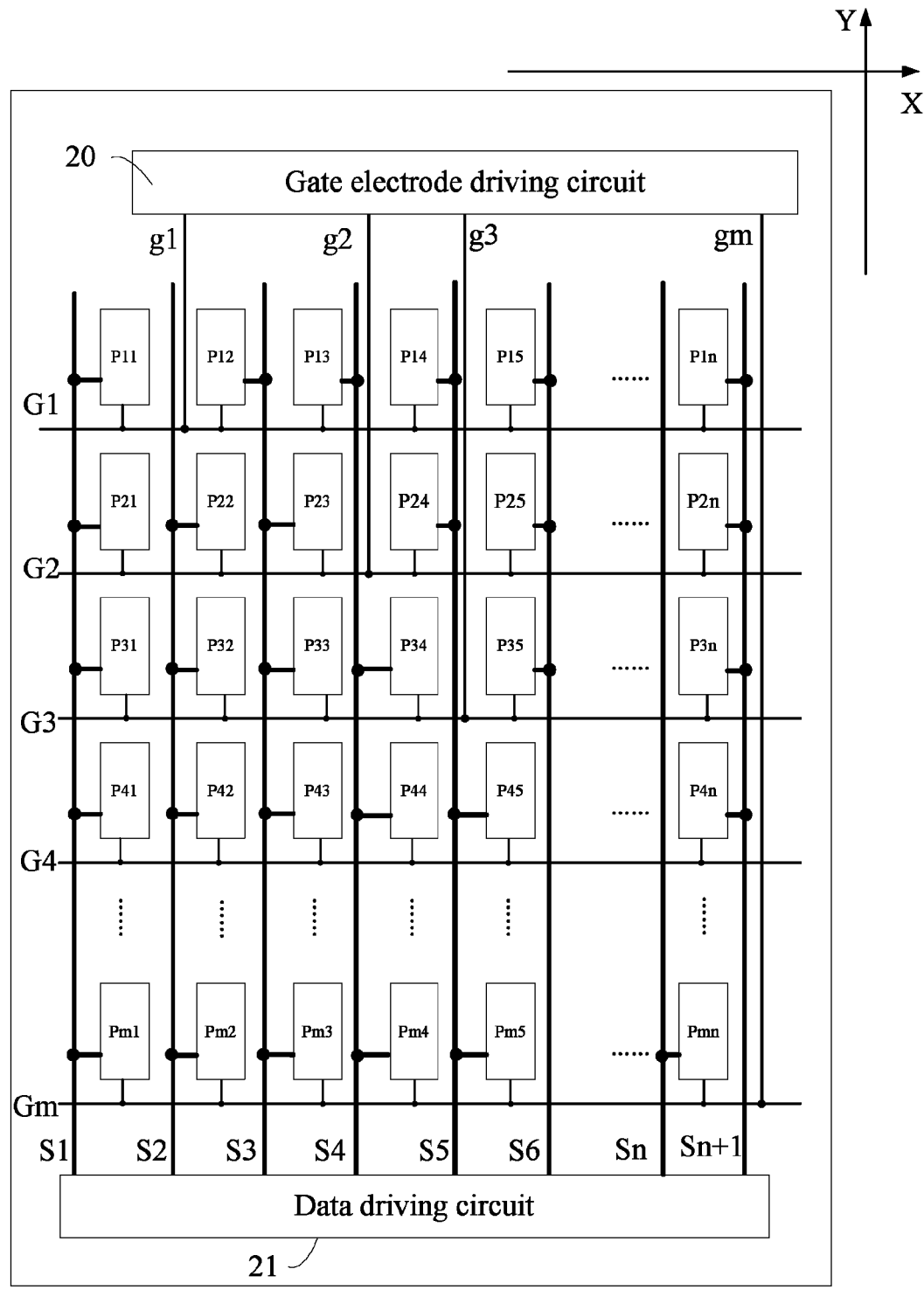
FIG. 4 illustrates another exemplary array substrate consistent with disclosed embodiments.

However, the present disclosure is not limited thereto, in other embodiments, two adjacent lead wires g may be spaced apart by a plurality of pixel columns. For example, in another embodiment, the plurality of lead wires g may include two lead wires g spaced apart by one pixel column and two lead wires g spaced apart by a plurality of pixel columns. FIG. 4 illustrates an exemplary array substrate consistent with disclosed embodiments. As shown in FIG. 4, the first lead wire g1 and the second lead wire g2 may be spaced apart by two pixel columns, and the second lead wire g2 and the third lead wire g3 may be spaced apart by one pixel column.

Further, in one embodiment, each pixel unit P may include a pixel electrode and a thin film transistor. When the pixel unit Pi1 to Pin in the $i^{th}$ pixel row are all connected to the data lines S far away from the $i^{th}$ lead wire gi, the thin film transistors in the pixel unit Pi1 to Pin in the $i^{th}$ pixel row may, respectively, be disposed close to one data line far away from the $i^{th}$ lead wire gi. Further, the thin film transistors may each include a gate electrode, a source electrode and a drain electrode. The gate electrode of each thin film transistor in the $i^{th}$ pixel row may be connected to the $i^{th}$ gate electrode line Gi. The source electrode of each thin film transistor in the $i^{th}$ pixel row may be connected to a corresponding data line far away from the $i^{th}$ lead wire gi. The drain electrode of each thin film transistor in the $i^{th}$ pixel row may be connected to a corresponding pixel electrode. Further, the disclosed array substrate may also include common electrodes disposed corresponding to the plurality of pixel units P. Accordingly, electric fields may be formed by the common electrodes and the pixel electrodes to drive the pixel units P for display.

Figure 5:
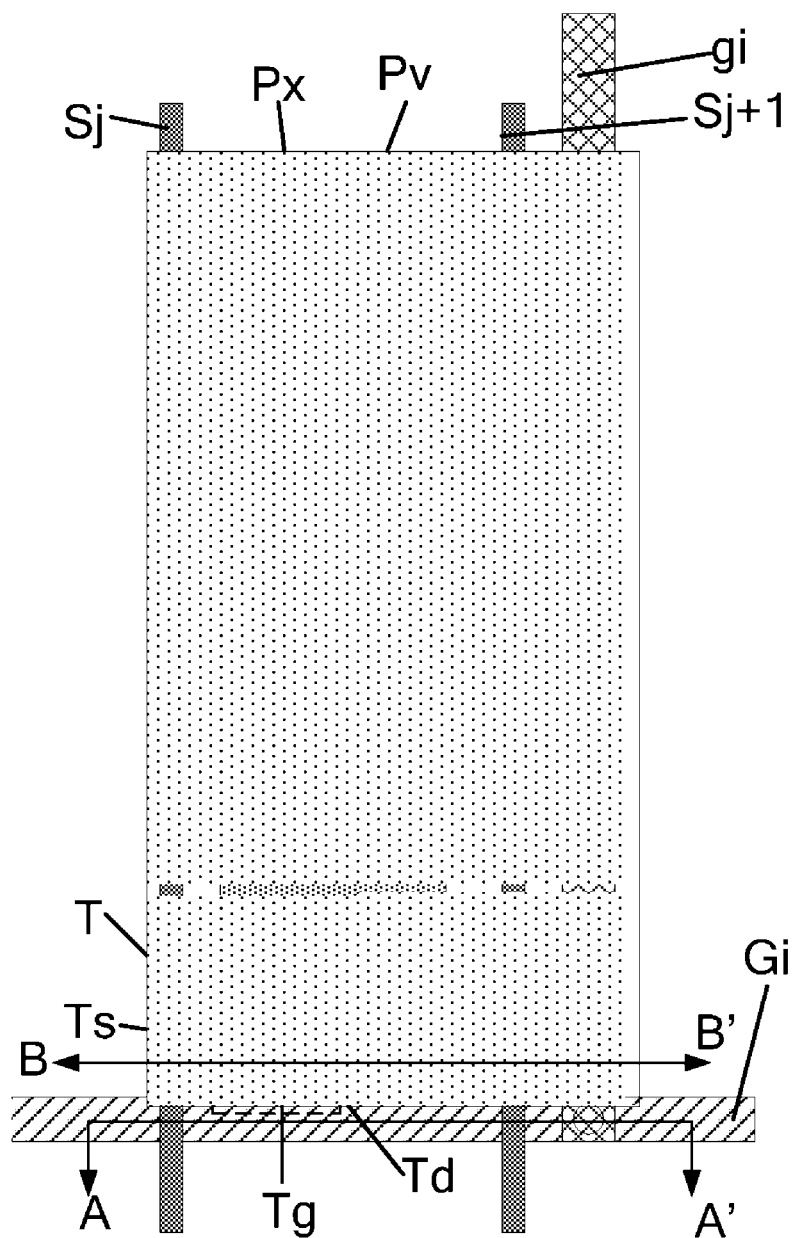
FIG. 5 illustrates an enlarged view of partial array substrate in FIG. 3 consistent with disclosed embodiments.

FIG. 5 illustrates an enlarged view of partial array substrate in FIG. 3 consistent with disclosed embodiments. As shown in FIG. 5, a thin film transistor T may be disposed close to the data line Sj that is far away from the $i^{th}$ lead wire gi. In particular, a gate electrode Tg of the thin film transistor T may be connected to the $i^{th}$ gate electrode line Gi, a source electrode Ts of the thin film transistor T may be connected to the data line Sj far away from the $i^{th}$ lead wire gi, and a drain electrode Td of the thin film transistor T may be connected to a pixel electrode Px. Further, as shown in FIG. 5, a common electrode Pv may be disposed over the pixel electrode Px. However, the present disclosure is not intended to limit the relative positions of the common electrode Pv and the pixel electrode Px.

Figure 6:
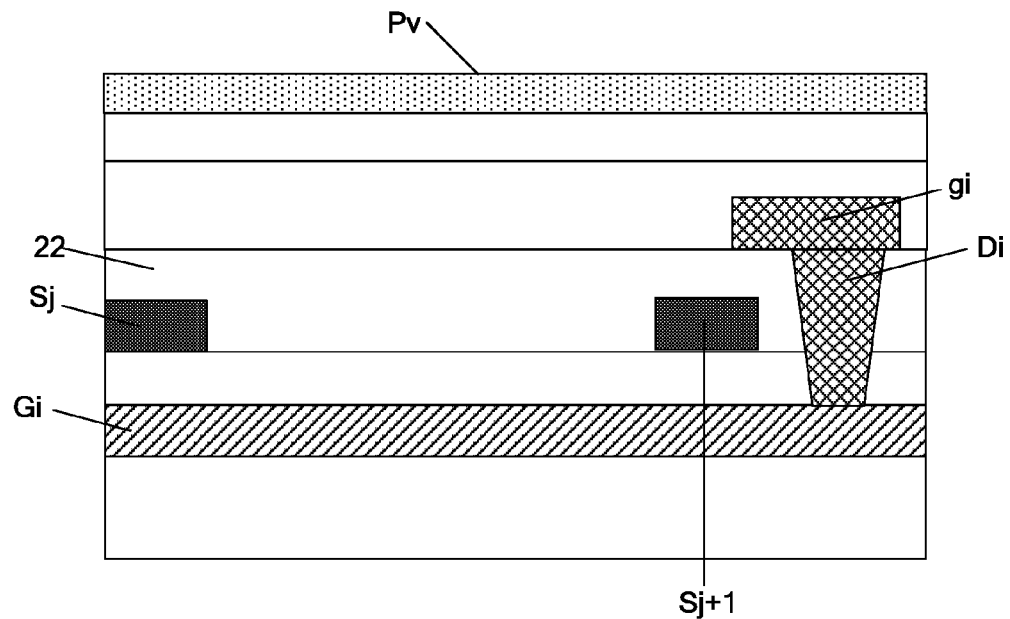
FIG. 6 illustrates an AA' cross-sectional view of an exemplary array substrate in FIG. 5 consistent with disclosed embodiments.

FIG. 6 illustrates an AA' cross-sectional view of an exemplary array substrate in FIG. 5 consistent with disclosed embodiments. As shown in FIG. 6, the $i^{th}$ lead wire gi, and the gate electrode line Gi connected to the $i^{th}$ lead wire gi may be disposed on different structural layers of the array substrate, thus avoiding the $i^{th}$ lead wire gi being connected to other gate electrode lines. For example, the signal interference caused by the connection between the second lead wire g2 and the gate electrode line G1 may be avoided. In particular, an insulation layer 22 or other structures may be disposed between the $i^{th}$ lead wire gi and the gate electrode line Gi connected to the $i^{th}$ lead wire gi. Further, the $i^{th}$ lead wire gi may be connected to the gate electrode line Gi via a through-hole Di.

Optionally, the $i^{th}$ lead wire gi, and the data line Sj+1 disposed close to the $i^{th}$ lead wire gi may be disposed on different structural layers of the array substrate, or disposed on the same structural layer of the array substrate. As shown in FIG. 6, the $i^{th}$ lead wire gi and the data line Sj+1 disposed close to the $i^{th}$ lead wire gi may be disposed on different structural layers of the array substrate. Further, the insulation layer 22 may be disposed between the $i^{th}$ lead wire gi and the data line Sj+1. Thus, the $i^{th}$ lead wire gi and the data line Sj+1 may be mutually insulated.

Optionally, the projection of the $i^{th}$ lead wire gi on the plane where the data lines are located may at least partially cover the data line Sj+1. Accordingly, the width of the gap between adjacent pixel columns may be reduced, and the number of pixel units disposable on the array substrate may be increased. Thus, the resolution of the display panel may be improved. In one embodiment, all the lead wires g may be disposed on the same structural layer, all the gate electrode lines G may be disposed on the same structural layer, and all the data lines S may be disposed on the same structural layer. However, the present disclosure is not limited thereto.

Figure 7:
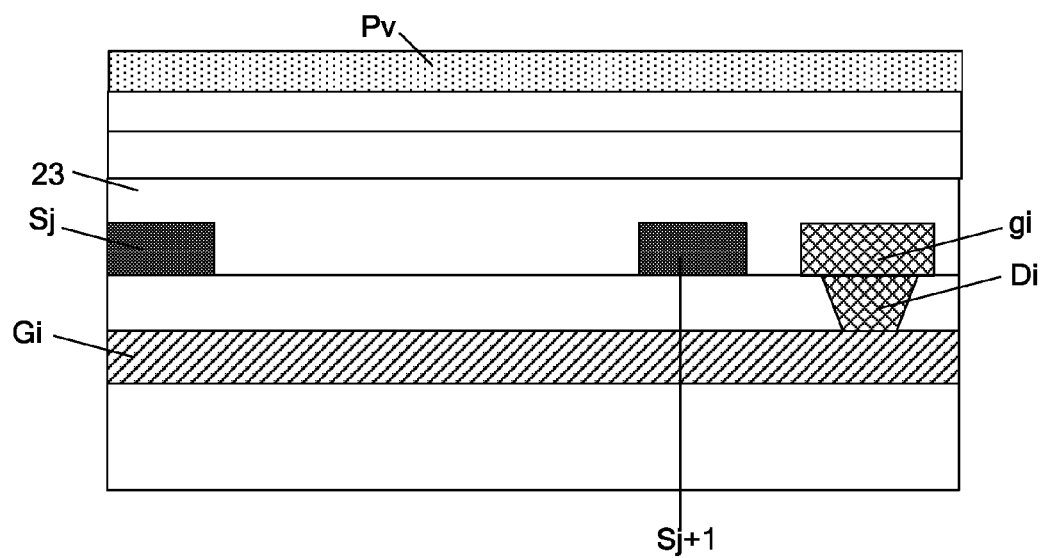
FIG. 7 illustrates another AA' cross-sectional view of an exemplary array substrate in FIG. 5 consistent with disclosed embodiments.

FIG. 7 illustrates another AA' cross-sectional view of an exemplary array substrate in FIG. 5 consistent with disclosed embodiments. As shown in FIG. 7, the $i^{th}$ lead wire gi may be disposed on the same structural layer as the data line Sj+1 that is disposed close to the $i^{th}$ lead wire gi. Further, the $i^{th}$ lead wire gi and the data line Sj+1 disposed close to the $i^{th}$ lead wire gi may be mutually insulated by the insulation layer 23 that covers the $i^{th}$ lead wire gi and the data line Sj+1. The $i^{th}$ lead wire gi may be connected to the gate electrode line Gi via the through-hole Di.

Figure 8:
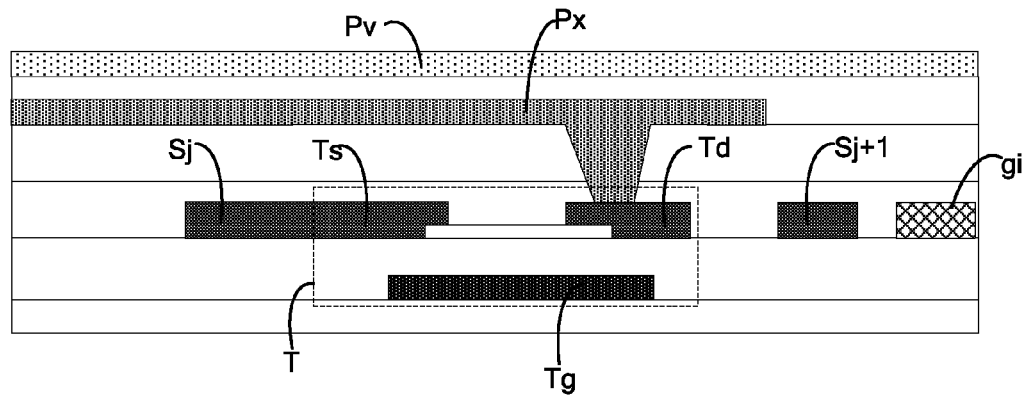
FIG. 8 illustrates a BB' cross-sectional view of an exemplary array substrate in FIG. 5 consistent with disclosed embodiments.

FIG. 8 illustrates a BB' cross-sectional view of an exemplary array substrate in FIG. 5 consistent with disclosed embodiments. As shown in FIG. 8, the common electrode Pv may be disposed over the pixel electrode Px, and the pixel electrode Px may be disposed on surface of the thin film transistor T.

Figure 9:
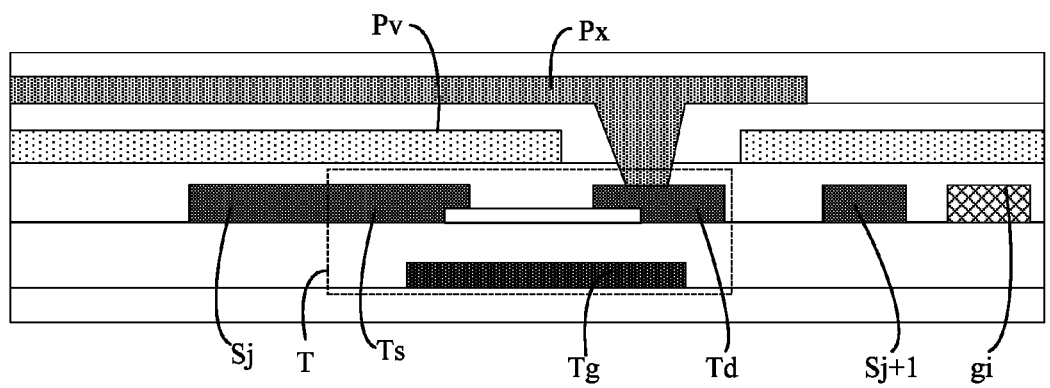
FIG. 9 illustrates another BB' cross-sectional view of an exemplary array substrate in FIG. 5 consistent with disclosed embodiments.

Other configurations may also be used. For example, in another embodiment, referring to FIG. 9 that illustrates another BB' cross-sectional view of an exemplary array substrate in FIG. 5 consistent with disclosed embodiments, the common electrode Pv may be disposed between the thin film transistor T and the pixel electrode Px.

In the disclosed array substrate, the pixel units in the $i^{th}$ pixel row may each be connected to one data line far away from the $i^{th}$ lead wire. Thus, when scanning the $i^{th}$ pixel row, the pixel units in the $i^{th}$ pixel row may transmit the data signals via the data lines far away from the $i^{th}$ lead wire. That is, when the $i^{th}$ lead wire transmits the scanning signal, the data line disposed close to the $i^{th}$ lead wire may not transmit the data driving signal, and when the data line close to the $i^{th}$ lead wire transmits the data driving signal, the $i^{th}$ lead wire may not transmit the scanning signal. Accordingly, the disclosed $i^{th}$ lead wire and the data line disposed close to the $i^{th}$ lead wire may not transmit signals simultaneously, thus avoiding the mutual interference between signals transmitted by the $i^{th}$ lead wire and the data line disposed close to the $i^{th}$ lead wire. Further, the abnormal display issue of the pixel units caused by signal interference may be avoided.

Figure 10:
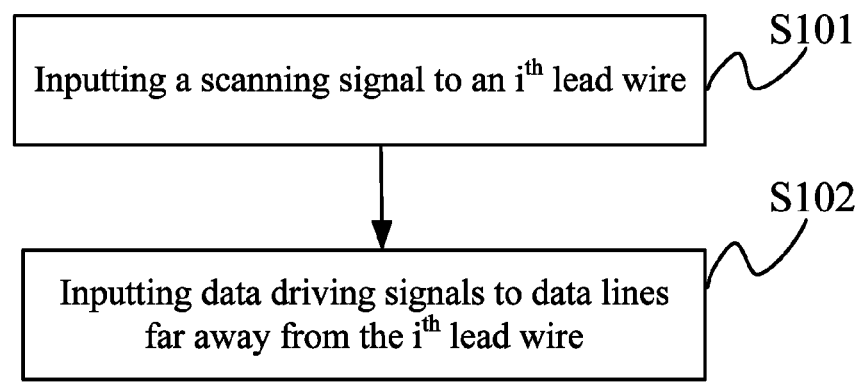
FIG. 10 illustrates a flow chart of a driving method of an exemplary array substrate consistent with disclosed embodiments.

The present disclosure also provides a driving method of an array substrate to be applied in any above-described array substrate. FIG. 10 illustrates a flow chart of a driving method for an exemplary array substrate consistent with disclosed embodiments. As shown in FIG. 10, the driving method may include inputting a scanning signal to the $i^{th}$ lead wire (S101), and inputting data driving signals to the data lines far away from the $i^{th}$ lead wire (S102).

Figure 13:
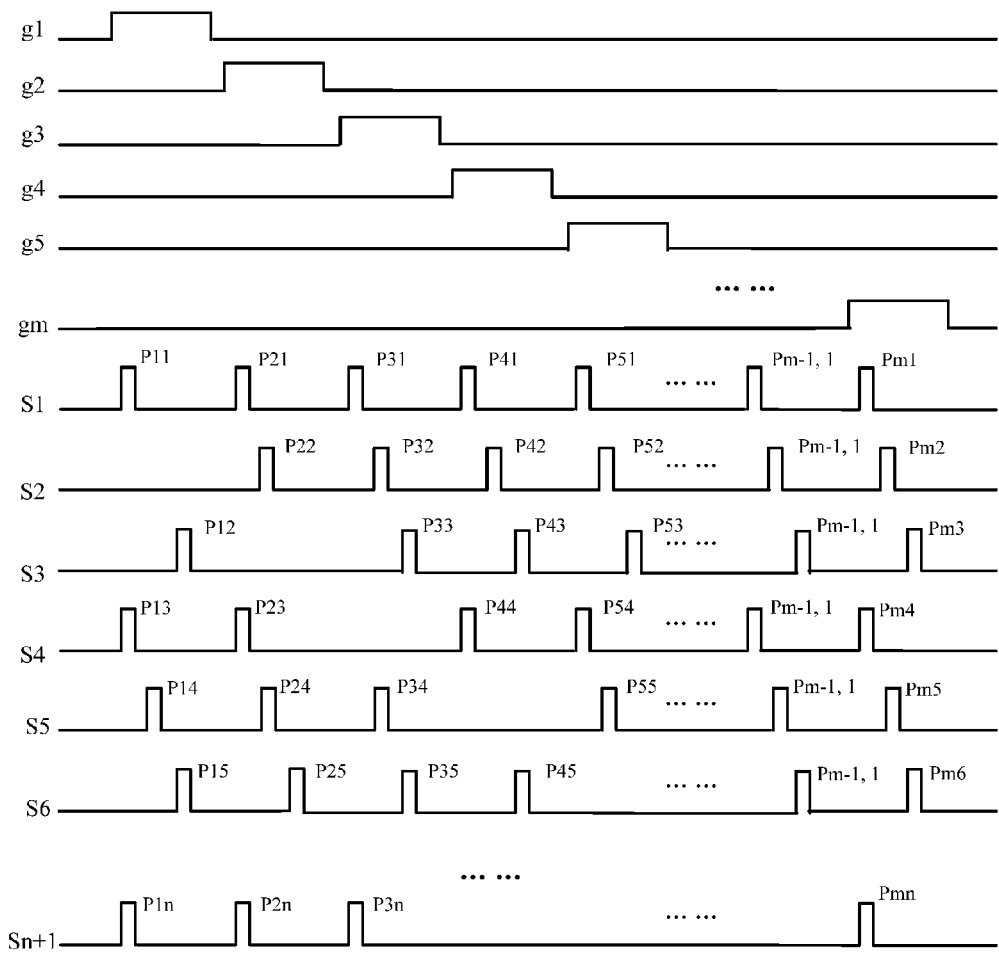
FIG. 13 illustrates an exemplary driving scheme of an array substrate in FIG. 3 consistent with disclosed embodiments.

Correspondingly, FIG. 13 illustrates an exemplary driving scheme of an array substrate in FIG. 3 consistent with disclosed embodiments. As shown in FIG. 13, when scanning the first pixel row, the gate electrode driving circuit 20 may input the scanning signal (e.g., a high voltage) to the first lead wire g1. The data driving circuit 21 may transmit the data driving signal to the pixel unit P11 via the data line S1 far away from the first lead wire g1, transmit the data driving signal to the pixel unit P12 via the data line S3 far away from the first lead wire g1, transmit the data driving signal to the pixel unit P13 via the data line S4 far away from the first lead wire g1, . . . , and transmit the data driving signal to the pixel unit P1n via the data line Sn+1 far away from the first lead wire g1. That is, the data driving circuit 21 may not transmit the data driving signal to the data line S2 that is close to the first lead wire g1, thus avoiding mutual interference between the first lead wire g1 and the data line S2.

Referring to FIG. 13, when scanning the second pixel row, the gate electrode driving circuit 20 may input the scanning signal to the second lead wire g2. The data driving circuit 21 may transmit the data driving signal to the pixel unit P21 via the data line S1 far away from the second lead wire g2, transmit the data driving signal to the pixel unit P22 via the data line S2 far away from the second lead wire g2, transmit the data driving signal to the pixel unit P23 via the data line S4 far away from the second lead wire g2, . . . , and transmit the data driving signal to the pixel unit P2n via the data line Sn+1 far away from the second lead wire g2. That is, the data driving circuit 21 may not transmit the data driving signal to the data line S3 that is close to the second lead wire g2, thus avoiding mutual interference between the second lead wire g2 and the data line S3. The scanning processes of other disclosed pixel rows may be similar to the above process, and are not repeated here.

In the disclosed driving method of the array substrate, when scanning the $i^{th}$ pixel row, the pixel units in the $i^{th}$ pixel row may transmit the data signals to the data lines far away from the $i^{th}$ lead wire. That is, when the $i^{th}$ lead wire transmits the scanning signal, the data lines disposed close to the $i^{th}$ lead wire may not transmit the data driving signal. Further, when the data line close to the $i^{th}$ lead wire transmits the data driving signal, the $i^{th}$ lead wire may not transmit the scanning signal. That is, the disclosed $i^{th}$ lead wire and the data line close to the $i^{th}$ lead wire may not transmit the signals simultaneously. Accordingly, the mutual interference between the signals transmitted by the $i^{th}$ lead wire and the data line disposed close to the $i^{th}$ lead wire may be avoided, and the abnormal display issue of the pixel units caused by signal interference may also be avoided.

Figure 11:
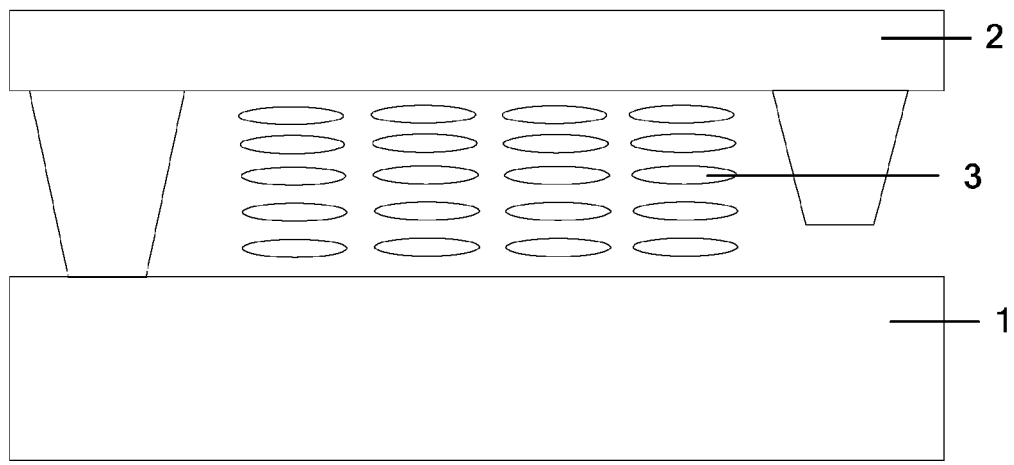
FIG. 11 illustrates a cross-sectional view of an exemplary display panel consistent with disclosed embodiments.

The present disclosure also provides a display panel, and the display panel may include the array substrate described in the above embodiments. The disclosed display panel may, for example, be a liquid crystal display panel. FIG. 11 illustrates a cross-sectional view of an exemplary display panel consistent with disclosed embodiments. The display panel may include an array substrate 1, a color film substrate 2 arranged opposite to the array substrate 1, and a liquid crystal layer sandwiched between the array substrate 1 and the color film substrate 2, etc. In particular, the disclosed display panel may be a liquid crystal display panel, or another type of display panel. The present disclosure is not intended to limit the type of the display panel.

Figure 12:
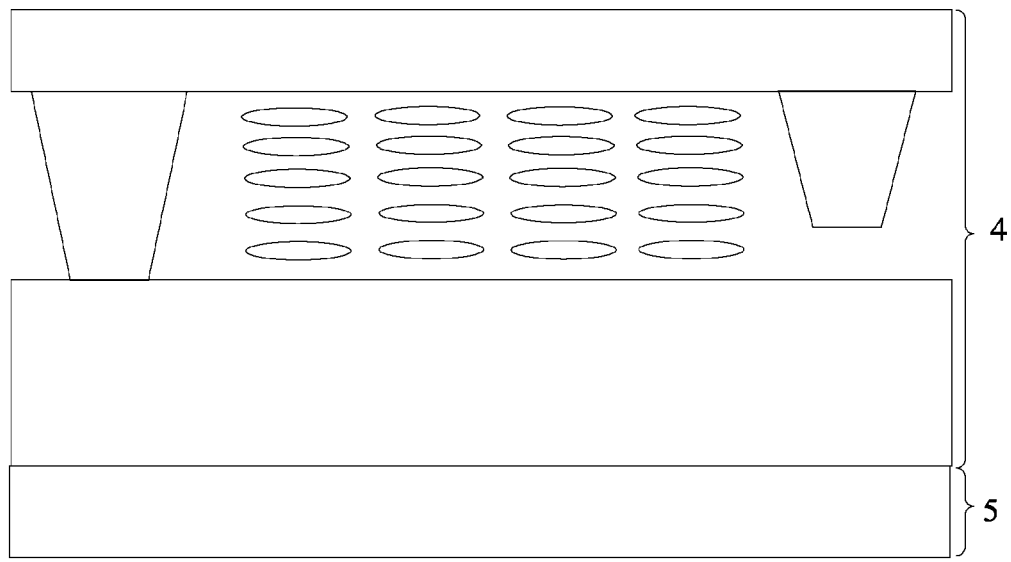
FIG. 12 illustrates a cross-sectional view of an exemplary display device consistent with disclosed embodiments.

The present disclosure also provides a display device, and the display device may include the display panel described in the above embodiments. Referring to FIG. 12, FIG. 12 illustrates a cross-sectional view of an exemplary display device consistent with disclosed embodiments. Similarly, the display device may be a liquid crystal display device. Further, the display device may include a display panel 4, and a backlight module 5 disposed on bottom of the display panel 4, etc.

In the disclosed display panel and display device, the $i^{th}$ lead wire and the data line disposed close to the $i^{th}$ lead wire may not transmit the signals simultaneously, thus avoiding the mutual interference between signals transmitted by the $i^{th}$ lead wire and the data lines disposed close to the $i^{th}$ lead wire. Further, the abnormal display issue of pixel units caused by signal interference may be avoided.

Various embodiments of the specification are described in a progressive way, each embodiment highlights its difference from other embodiments, and the same or similar parts between various embodiments may refer to each other. For the disclosed device, because it corresponds to the disclosed method in the embodiments, thus the descriptions are relatively simple, and the related parts may be referred to the descriptions of the method.

The above descriptions of the disclosed embodiments are presented to enable any person skilled in the art to make or use the invention. Various modifications to the disclosed embodiments will be readily apparent to those skilled in the art, and the general principles defined herein may be applied to other embodiments without departing from the spirit and scope of the present disclosure. Thus, the present disclosure is not limited to the embodiments shown, but is to be accorded the widest scope consistent with the principles and novel features herein disclosed.

What is claimed is:

1. An array substrate, comprising:
    a plurality of pixel units arranged in an array;
    m number of gate electrode lines extending along a first direction, where m is a positive integer;
    a plurality of data lines extending along a second direction; and
    m number of lead wires extending along the second direction,
    wherein the plurality of pixel units are arranged in pixel columns along the second direction and m number of pixel rows along the first direction, pixel units in an $i^{th}$ pixel row are correspondingly connected to an $i^{th}$ gate electrode line, and the $i^{th}$ gate electrode line is correspondingly connected to an $i^{th}$ lead wire, where i is a positive integer and $1 \leq i \leq m$, and
    each of the pixel columns is disposed between two adjacent data lines, each of the lead wires is disposed corresponding to a nearby data line, each of the pixel units is connected to an adjacent data line, the pixel units in a pixel row are connected to different data lines, respectively, and the pixel units in the $i^{th}$ pixel row are connected to the data lines far away from the $i^{th}$ lead wire.

2. The array substrate according to claim 1, wherein: the first direction is perpendicular to the second direction.

3. The array substrate according to claim 1, further comprising:
    a gate electrode driving circuit disposed in an extension direction of the lead wires, wherein the gate electrode driving circuit is connected to the lead wires and is configured to input scanning signals to the lead wires sequentially.

4. The array substrate according to claim 3, further comprising:
    a data driving circuit connected to the plurality of data lines, wherein the data driving circuit is configured to input data driving signals to the data lines far away from the $i^{th}$ lead wire when the gate electrode driving circuit inputs the scanning signal to the $i^{th}$ lead wire.

5. The array substrate according to claim 4, wherein:
the gate electrode driving circuit and the data driving circuit are disposed on two opposite regions of the array substrate, respectively.

6. The array substrate according to claim 1, wherein:
two of the adjacent lead wires are spaced apart by one of the pixel columns.

7. The array substrate according to claim 1, wherein:
two of the adjacent lead wires are spaced apart by a plurality of pixel columns.

8. The array substrate according to claim 1, wherein:
the lead wire and the gate electrode line connected to the lead wire are disposed on different structural layers of the array substrate, respectively; and
the lead wire is connected to the gate electrode line via a through-hole.

9. The array substrate according to claim 1, wherein:
the lead wire and the data line close to the lead wire are disposed on different structural layers of the array substrate, respectively; and
an insulation layer is disposed between the lead wire and the data line.

10. The array substrate according to claim 9, wherein:
a projection of the lead wire on a plane where the data lines are located covers at least a part of the data lines.

11. The array substrate according to claim 1, wherein:
the lead wire and the data line close to the lead wire are disposed on a same structural layer of the array substrate; and
the lead wire and the data line are mutually insulated.

12. The array substrate according to claim 1, wherein:
the pixel unit includes a pixel electrode and a thin film transistor, the thin film transistor of the pixel unit in the $i^{th}$ pixel row is disposed close to the data line far away from the $i^{th}$ lead wire; and
the thin film transistor includes a gate electrode, a source electrode, and a drain electrode, the gate electrode is connected to the $i^{th}$ gate electrode line, the source electrode is connected to the data line far away from the $i^{th}$ lead wire, and the drain electrode is connected to the pixel electrode.

13. A display panel, comprising the array substrate according to claim 1.

14. The display panel according to claim 13, further comprising:
a color film substrate arranged opposite to the array substrate, and
a liquid crystal layer sandwiched between the color film substrate and the array substrate.

15. A display device, comprising the display panel according to claim 13.

16. The display device according to claim 15, further comprising:
a backlight module disposed on bottom of the display panel.

17. A method for driving an array substrate, wherein the array substrate comprises a plurality of pixel units arranged in an array, m number of gate electrode lines extending along a first direction, where m is positive integer, a plurality of data lines extending along a second direction, and m number of lead wires extending along the second direction, the plurality of pixel units are arranged in pixel columns along the second direction and m number of pixel rows along the first direction, pixel units in an $i^{th}$ pixel row are correspondingly connected to an $i^{th}$ gate electrode line, and the $i^{th}$ gate electrode line is correspondingly connected to an $i^{th}$ lead wire, where i is a positive integer and $1 \leq i \leq m$, each of the pixel columns is disposed between two adjacent data lines, each of the lead wires is disposed corresponding to a nearby data line, each of the pixel units is connected to an adjacent data line, the pixel units in a pixel row are connected to different data lines, respectively, and the pixel units in the $i^{th}$ pixel row are connected to the data lines far away from the $i^{th}$ lead wire, the method comprising:
inputting a scanning signal to the $i^{th}$ lead wire, and
inputting data driving signals to the data lines far away from the $i^{th}$ lead wire.

* * * * *